UNITED STATES PATENT OFFICE.

JOHN ODDY LUMSDEN, OF SEATTLE, WASHINGTON.

YEAST SUBSTITUTE.

1,226,347.  Specification of Letters Patent.  Patented May 15, 1917.

No Drawing.  Application filed December 4, 1916.  Serial No. 134,880.

*To all whom it may concern:*

Be it known that I, JOHN O. LUMSDEN, a citizen of the United States, and a resident of Seattle, in the county of King and State of Washington, have invented a new and Improved Yeast Substitute, of which the following is a full, clear, and exact description.

My invention relates to a yeast substitute which accelerates fermentation and which causes a thorough and quick incorporation of carbonic acid gas in the dough formed. It expedites the handling of the dough and permits the baking of the dough within an hour after the mixing of the ingredients which constitute the dough. It also increases the keeping qualities of the bread.

My yeast substitute, which I call grain wine, consists of the following ingredients in the following proportions:

|   | Per cent. |
|---|---|
| Boiling-hot water | 79.2 |
| Rice flour | 7.9 |
| White-corn flour | 2.00 |
| White-wheat flour | 2.00 |
| Granulated sugar | 1.00 |
| Malted barley | 7.9 |

Unmalted grain may also be used in place of malted barley.

The above ingredients are mixed and allowed to ferment, then the liquid part is drawn off and stored in a cool place until it is to be used.

In making the dough to form bread, the following ingredients are used in addition to the grain wine and in the following proportions:

For 196 pounds of flour:
  4 pounds of lard,
  3½ pounds of granulated sugar,
  4 pounds of salt,
  25 quarts of water,
  24 quarts of grain wine.

In per cent. the ratios by weight are as follows:

|   | Per cent. |
|---|---|
| Flour | 58.5 |
| Lard | 1.25 |
| Granulated sugar | 1.00 |
| Salt | 1.25 |
| Water | 18.6 |
| Grain wine | 19.4 |

The ingredients are mixed in the following manner. The lard is rubbed into the dry flour. They are then placed into the mixer, salt and sugar being added. The water and the grain wine are poured in and the mass thoroughly mixed and agitated for about forty-five minutes. During the mixing of the dough in the mixer the mass is subjected in the mixer to carbonic-acid gas under a pressure of 75 pounds. The gas helps to raise the dough in a shorter interval of time. From the mixer the dough is placed directly into pans which are immediately placed into a bake oven and the loaves baked for about 30 minutes.

The bread resulting keeps for a considerably longer time and the taste of the same is greatly improved. Furthermore, the use of grain wine greatly expedites the making of the bread as it takes only about one-eighth of the time it takes ordinarily when making bread with ordinary yeast. It therefore results in a more economical method of making bread. Also, the use of grain wine with the ingredients forming the dough requires very simple machinery, that is, only an ordinary mixer, thus, making the method sanitary and inexpensive.

I claim:

1. A yeast substitute, which comprises water, flours of rice, corn and wheat, sugar and malted barley, in proportions substantially as specified, mixed and fermented, the resulting liquid forming a substitute for yeast.

2. A yeast substitute, which consists of the following ingredients, water, rice flour, white-corn flour, white-wheat flour, granulated sugar, and malted grain, in proportions substantially as specified, mixed and fermented, the resulting liquid forming the substitute for yeast.

3. A yeast substitute which consists of the following ingredients, water, flours of rice, corn and wheat, granulated sugar and grain, in proportions substantially as specified, mixed and fermented, the resulting liquid forming a substitute for yeast.

JOHN ODDY LUMSDEN.